United States Patent [19]

Staar

[11] 4,040,104
[45] Aug. 2, 1977

[54] TAPE CASSETTE APPARATUS WITH PLURAL INTERMEDIATE POSITIONS

[75] Inventor: Theophiel Clement Jozef Lodewijk Staar, Kraainem, Belgium

[73] Assignee: Staar, S.A., Brussels, Belgium

[21] Appl. No.: 667,950

[22] Filed: Mar. 18, 1976

[30] Foreign Application Priority Data

Mar. 21, 1975 France .................................. 75.08963

[51] Int. Cl.² .............................................. G11B 15/00
[52] U.S. Cl. ...................................... 360/96; 242/198; 226/90
[58] Field of Search .................. 360/96, 92, 93, 105; 242/198; 226/90, 91, 176

[56] References Cited

U.S. PATENT DOCUMENTS

| | | | |
|---|---|---|---|
| 3,632,113 | 1/1972 | Nakamura | 360/96 |
| 3,719,364 | 3/1973 | Hessland | 360/96 |
| 3,818,504 | 6/1974 | Schroeder | 360/96 |

FOREIGN PATENT DOCUMENTS

| | | | |
|---|---|---|---|
| 2,335,699 | 1/1974 | Germany | 242/201 |

*Primary Examiner*—Bernard Konick
*Assistant Examiner*—John H. Wolff

*Attorney, Agent, or Firm*—Leydig, Voit, Osann, Mayer & Holt, Ltd.

[57] ABSTRACT

A cassette tape recording apparatus of the type in which the pressure roller and the recording and reproducing head are mounted on a support movable between a retracted position and an operative position which provides a stable intermediate position into which the movable support automatically moves upon insertion of a cassette into the machine. Once the movable support is in the stable intermediate position, it may be selectively moved into and from the operative position and into the retracted position. A stop responsive to the insertion of a cassette restrains the movable support in the retracted position prior to the insertion of a cassette. When a cassette is inserted into the machine, the stop is released and a spring moves the movable support toward the operative position. A latching lever arrests and maintains the movable support in a stable intermediate position. An operator-actuated slide is porvided which acts upon the latching lever and/or the movable support to move the movable support into and from the operative position and into the retracted portion. A separate mechanism is provided to temporarily move the movable support into an unstable intermediate position to facilitate rewinding the tape during the operation of the machine.

13 Claims, 9 Drawing Figures

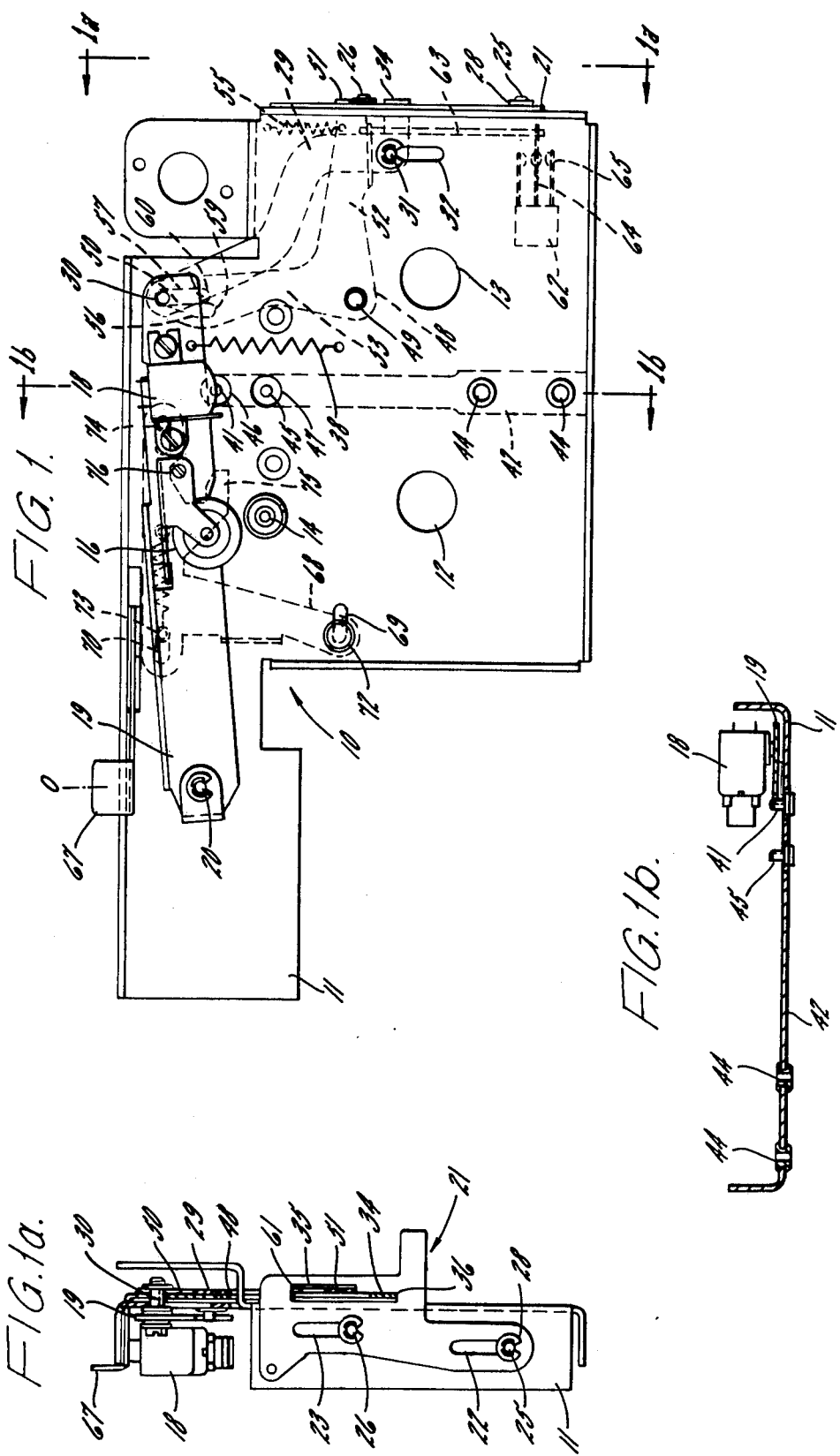

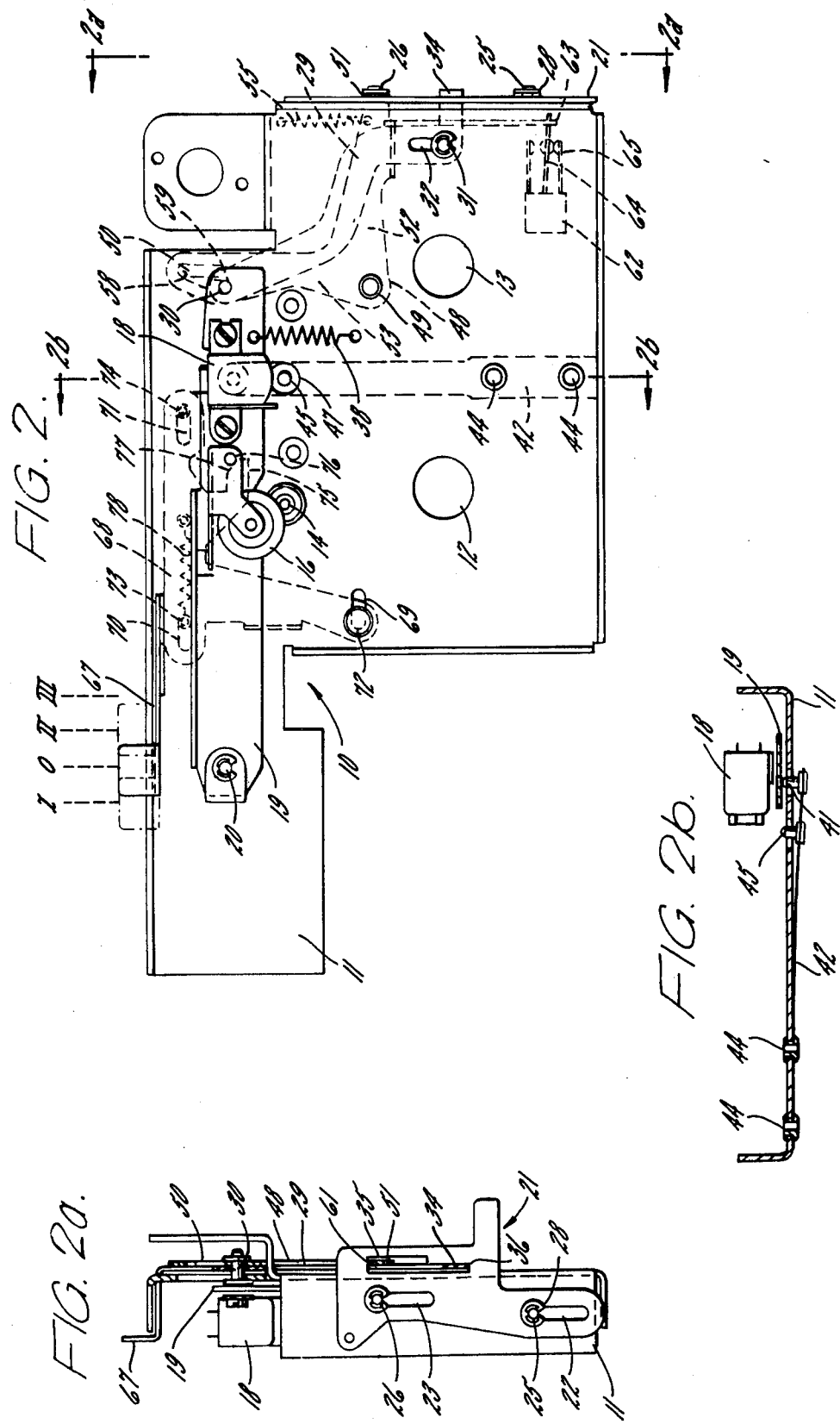

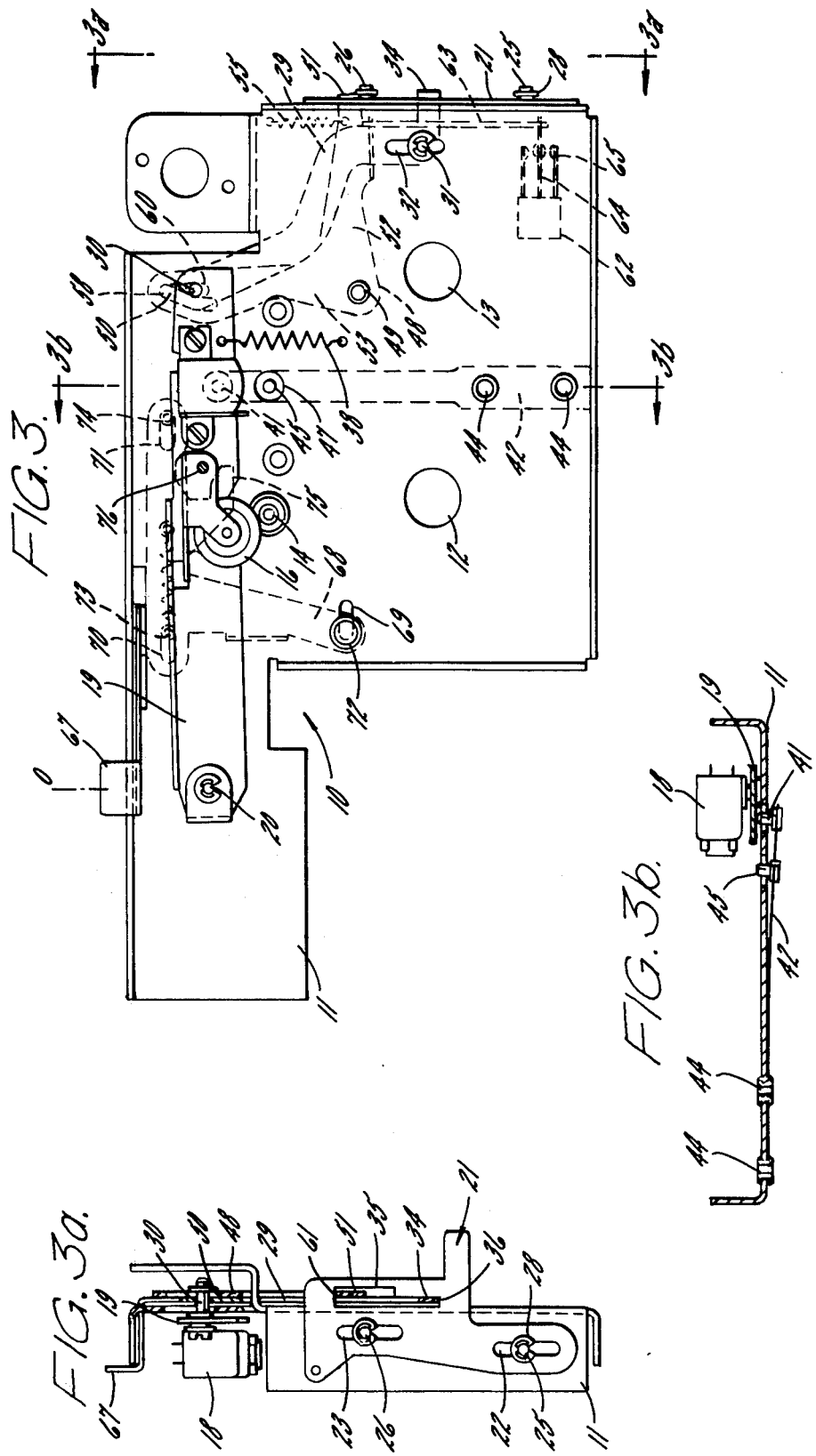

TAPE CASSETTE APPARATUS WITH PLURAL INTERMEDIATE POSITIONS

This invention relates generally to apparatus for the recording and playback of sound from a magnetic tape in a cassette and, more particularly, to such apparatus particularly suited for portable dictating machines The operating principles of dictating machines are similar with those of conventional cassette-type tape recorders. The particular functions to be served by dictating machines, however, requires that certain criteria be observed in designing the machines. Ease of handling and ease of control and manipulation are among the major considerations in the design of dictating machines. These factors are especially important in the case of hand-held portable dictating units which, for maximum convenience, should be operable with minimum force and displacement by one or two fingers of the same hand in which the machine is held.

Achieving the above objectives is a difficult task in view of the several essential functions which a dictating machine must perform. In general, dictating machines must have the operating modes of "record," "play," "reverse" and, of course, "stop," and means for shifting between these modes.

In shifting between these operating modes, the positions of various elements of the mechanisms must be changed. For example, in cassette tape recorder apparatus which employs a capstan drive with a pressure roller element pinching the tape against the capstan element in record and in play modes, these elements of the mechanism are shifted for the reverse mode to permit fast transport of the tape, and the recording-playback head is also preferably shifted to be free from pressure engagement with the tape to avoid undue head and tape wear. Such apparatus where the pressure roller and head are movble to shift between the various modes of operation, is to be distinguished from cassette tape recorder apparatus in which the cassette and its support are bodily moved to shift between the various modes of operation as exemplified in Staar U.S. Pat. No. 3,385,534. Both types of apparatus have advantages in certain applications. Thus, the apparatus of U.S. Pat. No. 3,385,534 is especially suited for music recording and playing because of the fixed head and high fidelity of sound reproduction obtainable therewith. In the apparatus of the type where the pressure roller and head are movable, although quality of sound reproduction may be less, it is adequate for applications such as dictating machines, and it has been found possible to use a simple mechanism, with lighter parts, which is manually manipulable with less force to allow the ease of operation and control particularly desired in dictating machines.

It will be appreciated, however, that the goal of achieving a simple mechanism is not always consistent with that of achieving ease of control and/or optimum operating conditions. For example, in apparatus of the type employing a movable pressure roller and head, where only two stable positions are provided therefor — a retracted position and an operative position — when this two-position provision is coupled with the further provision of automatically triggering a cassette ejecting mechanism upon retraction of the pressure roller and head, problems are encountered in minimizing the discrete operator manipulations required to operate the machine. Since automatic ejection of the cassette accompanies retraction of the pressure roller and head, as long as the cassette is in the machine, even when the machine is in the stop mode, the pressure roller and head rest against the magnetic tape. In view of the fact that the pressure roller comprises a thick outer layer of rubber, the diameter of which is far greater than that of the capstan, the capstan tends to mark the rubber, leaving a slight impression therein, when the pressure roller rests against the capstan for a considerable length of time. Such an impression may result in an irregularity in the driving of the tape, thereby impairing the quality of performance of the dictating machine. A further disadvantage in allowing the pressure roller to rest against the capstan for a long period of time is that the magnetic tape may stick to the pressure roller.

Even if the above disadvantages are avoided in a two-position system by permitting the pressure roller and the head to be retracted without triggering an automatic cassette ejection system (thereby requiring an extra operator input to effect ejection of the cassette) a two-position system has an inherent operational disadvantage. With the only positional options for the pressure roller and the head being the operative positions and the retracted positions, it is necessary to effect full retraction of the pressure roller and head when the opening of a slight gap would suffice to relieve the undesirable pressure between the pressure roller, the tape and the capstan prior to allowing the cassette to remain in the machine for a period of time without use. From an operational standpoint, the operator input necessary to effect such full retraction results in a sacrifice in the ease of operation. Either considerable displacement of the control device must be achieved, or, if a mechanical advantage is employed to reduce the magnitude of the displacement, a high level of force must be applied to accomplish the retraction. Each of these circumstances run counter to the goal of permitting the easy, one-hand operation of the dictating machine.

At least some of the aforementioned disadvantages may be avoided by providing an intermediate position or positions for the pressure roller and the head between the extremes of the operative positions and the retracted positions. Staar U.S. Pat. No. 3,385,534, referenced above, and U.S. Pat. No. 3,818,504 are examples of tape recorder apparatus which provide an intermediate pressure roller and head position, but in the former example the cassette and its support are bodily movable to achieve such position and in the latter example the intermediate position is optional upon insertion of the cassette. With such a system, the operator must deliberately select the intermediate position prior to inserting the cassette to prevent the system from moving directly into the operative condition. With such an arrangement, the above-described benefits to be derived from the intermediate position may be lost. Furthermore, such systems do not provide visible indication as to which position the apparatus is in.

An object of the present invention is to provide a mechanism adapted for use in apparatus for the recording and playback of sound from a magnetic tape in a cassette, particularly suited for use in portable dictating machines, which provides stable intermediate positions for the pressure roller and the head while maintaining simplicity of design and ease of operation.

A further object is to provide a system of the type described above characterized by stable intermediate positions for the pressure roller and head which are automatically assumed upon the insertion of the cassette into the apparatus.

Another object of the present invention is to provide a mechanism which provides readily visible indication as to the position of the movable support within the dictating machine.

Still another object of the present invention is to provide a mechanism which has light, durable parts for operation with little manual effort, while providing a high degree of reliability in a precision mechanism.

Other objects and advantages of the invention will become apparent upon reading the following detailed description and upon reference to the drawings in which:

FIG. 1 is a plan view of the mechanism of the present invention shown with the pressure roller and recording/playback head retracted to permit insertion or removal of a cassette;

FIG. 1a is a side view of the apparatus shown in FIG. 1 and is viewed from the direction of the arrows a—a;

FIG. 1b is sectional view of the apparatus shown in FIG. 1, taken along the line b—b;

FIG. 2 is a plan view of the mechanism of the present invention corresponding to that in FIG. 1 but showing the pressure roller and the recording/playback head advanced to their operative positions;

FIG. 2a is a side view of the apparatus shown in FIG. 2, as viewed from the direction of the arrows a—a;

FIG. 2b is a sectional view of the apparatus shown in FIG. 2, taken along the line b—b;

FIG. 3 is a plan view of the mechanism of the present invention corresponding to those in FIGS. 1 and 2 but showing the pressure roller and the recording/playback head in intermediate positions between the fully retracted position of FIG. 1 and the operative position of FIG. 2;

FIG. 3a is a side view of the apparatus shown in FIG. 3, as viewed from the direction of the arrows a—a; and FIG. 3b is a sectional view of the apparatus shown in FIG. 3, taken along the line b—b.

While the invention will be described in connection with a preferred embodiment, it will be understood that the invention is not limited in applicability to this embodiment, but is equally applicable to alternative and equivalent constructions.

Turning to the drawings, there is shown a dictating machine according to the present invention. Components well known to those skilled in the art but not essential to the understanding of the present invention have been omitted for the sake of clarity.

The dictating mechanism 10 comprises a fixed frame or chassis 11 designed to accept a conventional cassette, not shown. A properly inserted cassette rests on the frame 11, with the edge of the cassette providing access to the tape being oriented horizontally and upwardly, as viewed in FIGS. 1-3, and with the reels therein being oriented over the openings 12 and 13 in the frame 11. Driving spindles, not shown, pass through said openings and engage the reels of the cassette. A driving capstan 14 penetrates a cassette as it is positioned in the apparatus.

In order to permit the insertion and removal of a cassette from the dictating machine 10, the pressure roller 16 and the head 18 must be withdrawn from the operative positions adjacent the magntic tape within the cassette into retracted positions away from the magnetic tape and clear of the cassette. FIG. 1 illustrates the pressure roller 16 and the head 18 in their retracted positions, while FIG. 2 illustrates the components in their operative positions. In addition, and in accordance with an aspect of the present invention, following insertion of a cassette into the apparatus and optionally at other times when the cassette is in position within the dictating machine but the unit is not in operation, the pressure roller 16 and the head 18 are maintained a slight distance from their operative positions in stable "intermediate" positions. FIG. 3 illustrates the pressure roller 16 and the head 18 in their stable intermediate positions.

In the embodiment shown, the movement of the pressure roller 16 and the head 18 are controlled by the movement of a single movable support 19 to which the pressure roller 16 and head 18 are attached. The support 19 pivots at one end about a pin 20 affixed to and projecting perpendicularly from the frame 11. The means and method by which the position of the movable support 19 is semi-automatically and selectively controlled constitute a primary aspect of the present invention and are hereinafter described in detail.

Turning now to FIGS. 1a through 3a, a translating slide 21 serves to select and to indicate the position of the movable support 19. The slide 21 is constrained to translate vertically through the cooperation of slots 22 and 23 therein with pins 25 and 26 projecting from the frame member 11. Snap rings 28 or other suitable means maintain the sliding relationship between the frame 11 and the slide 21.

According to one aspect of the present invention, the slide 21 provides a readily observable indication as to the position of the movable support 19. The correspondence between the movable support position and the slide position is maintained by a bar 29. The upper end of the bar 29, as viewed in FIGS. 1-3, has a clearance hole through which a lug 30 projecting from the movable support 19 passes. With this arrangement, the upper end of the bar 29 is constrained to move in unison with the lug 30, which undergoes substantially translational movement as a result of the pivoting of the movable support 19 about the pin 20. The lower end of the bar 29 is provided with a pin 31 which is free to translate in a vertical slot 32 in the frame 11. A snap ring 28 or other suitable means maintains a sliding relationship between the bar 29 and the frame 11. A projection 34 extends from the lower end of the bar 29 near the pin 31. This projection 34 passes through an opening 35 in the slide 21. Biasing means (not shown) exert a constant upward force on the slide 21 such that the lowermost edge 36 of the opening 35 in the slide 21 is maintained in contact with the projection 34 of the bar 29. The effect of this relationship is two-fold. First, as the movable support 19 moves from the retracted position (FIG. 1) to the intermediate position (FIG. 3), and from the intermediate position to the operative position (FIG. 2), the slide 21 is passive, moving downward through the action of the bar 29, thereby providing a readily observable indication to the operator of the position of the movable support 19. Second, the slide 21 may be actively employed to effect the upward movement of the movable support 19 from the operative position into the intermediate position, and from the intermediate position into the retracted position. Movement of the slide 21 by the operator is transmitted to the movable support 19 through the bar 29.

The operation of the movable support positioning sub-system will be described by tracing through the several stages of operation beginning from the time just prior to the insertion of a cassette into the machine until the removal of the cassette. In this manner, the configurations, functioning and interactions of the various components, as well as the operator inputs necessary to operate the system, may be readily understood.

Referring now to FIGS. 1, 1a and 1b, the apparatus 10 is shown with the movable support 19 in the fully retracted position as it would be just prior to the insertion of a cassette into the machine. In this position, as in all positions hereinafter described, the movable support 19 is subject to the force exerted by the spring 38 upon the free end of the movable support and tending to rotate the movable support clockwise. As may be seen by reference to FIG. 1b, however, with the movable support 19 in the retracted position, means are provided to restrain the movement of the movable support 19 toward the operative position. The restraining means comprise a lug 41 affixed to and upstanding from a spring blade 42. As shown in FIG. 1b, the spring blade 42 is attached at one end to the frame 11 by rivets 44 or other suitable means. The restraining lug 41 as well as a second lug 45 pass through clearance holes 46 and 47 in the frame. As a cassette (not shown) is guided over the spindles (not shown) and the capstan 14, the lower surface of the cassette (as it would be viewed in FIG. 1b) will bear upon the second lug 45, causing the spring blade 42 to flex downward, thereby removing the restraining lug 41 from its position opposing the movement of the movable support 19 toward the operative position. With the restraining lug 41 no longer opposing its movement, the movable support 19 will move clockwise under the force of the spring 38.

If unrestrained, the movable support 19 would rotate clockwise until the pressure roller 16 pressed the magnetic tape (not shown) into contact with the driving capstan 14. Such an arrangement would be similar to known two-position systems, as discussed above. According to the present invention, however, means are interposed to arrest the movable support 19 after the pressure roller 16 and the head 18 have entered the cassette but prior to the assumption of their operative positions, wherein the pressure roller 16 is spaced from the drive capstan 14 sufficient to allow movement of the tape therebetween and the head 18 is spaced from the operative position out of contact with the magnetic tape. This stable intermediate position of the movable support 19 is shown in FIG. 3.

The means interposed to arrest the motion of the movable support 19 and to restrain it in the intermediate position is an L-shaped pivoted latching lever 48. This latching lever 48 interconnects the movable support 19 and the slide 21 and cooperates therewith to control the position of the movable support in response to actuation of the slide. In addition, as will be explained below, the latching lever 48 serves to assure that the electromechanical tape transport system (not shown) is enabled only when the movable support 19 is in the operative position.

Referring to the drawings, the latching lever 48 is pivoted about a pin 49 which projects perpendicularly from the surface of the frame 11. At the outer end of the vertically extending arm of the latching lever 48 is provided a specially adapted opening 50 into which projects the lug 30 extending perpendicularly from the movable support 19 and passing through the bar 29 as explained above. The configuration of the opening 50 and the manner in which it serves to arrest the movable support 19 as it moves from the retracted to the intermediate position and thereafter allows the movable support to move into the operative position will become clear from the following discussion. A projection 51 of the horizontally extending arm 52 of the latching lever 48 projects through the opening 35 in the slide 21. The opening 35 of the slide 21 permits movement of the latching lever 48 with respect to the slide 21, while also enabling the slide to actuate the latching lever 48 at certain points in the operation of the mechanism. As with specially adapted opening 50 in the vertical arm 53 of the latching lever 48, the configuration and functioning of the opening 35 in the slide 21 may be best explained by tracing through the actual operation of the machine 10.

The horizontally extending arm 52 of the latching lever 48 is biased upward by a spring 55. As a result, the latching lever 48 is subject to a constant force tending to rotate it in a counterclockwise direction.

The opening 50 in the latching lever 48 into which the lug 30 from the movable support 19 extends is designed to allow the movable support to pivot, with the limits of movement of the movable support at any time dependent upon the instantaneous position of the latching lever. As has already been mentioned, the latching lever 48 is biased counterclockwise and, accordingly, if otherwise unrestrained, will move in that direction. In addition, the action of the slide 21 upon the lever may cause the lever to rotate clockwise against the forces of the biasing spring 38. One or the other or a combination of these factors define the position of the latching lever 48 at any given instant.

The opening 50 bears roughly the shape of a closed, inverted V, with the left leg 56 of the opening, as viewed in FIGS. 1-3, being longer than the right leg 57. The right leg 57 of the opening 50 is designed to permit the movement of the lug 30, and, accordingly, of the movable support 19, between the apex of the inverted V and the bottom of the leg. These limits of travel correspond to the retracted and intermediate positions of the movable support 19. The left leg 56 of the opening 50, extending further downward beyond the lower edge of the right leg 57, permits the lug 30 to travel further downward, to the point where the movable support 19 assumes the operative position. It will be appreciated that the lug 30 cannot move from the position at the apex 58 of the opening into the lower portion of the left leg 56 without a clockwise movement of the latching lever 48 after the lug has left the apex of the opening. Further, since the spring 38 is biasing the lever counterclockwise, such clockwise movement of the latching lever 48 must be effected by operator-actuation of the slide 21 to exert the necessary force on the projection 51 of the lever 48. The effect of this arrangement is to assure that the movable support 19 always assumes the intermediate position upon insertion of a cassette into the machine. Thereafter the operator must deliberately provide an input to allow the movable support 19 to move into the operative position.

Referring to FIGS. 1a and 3a, the interaction of the slide 21, bar 29 and latching lever 48 accompanying the movement of the movable support 19 from the retracted to the intermediate position may be observed. In FIG. 1a the slide 21 is at the uppermost limit of its travel, being held thereby by biasing means (not shown). The projection 34 of the bar 29 is in contact with the lowermost portion 36 of the opening 35. The projection 51 of the latching lever 48 is supported by a step in the right side of the opening 35. Upon the insertion of a cassette into the machine 10 and the release of the lug 41, the downward movement of the movable support 19 is transmitted through the bar 29 to the slide 21, causing the slide to move downward. The opening 35 in the slide allows the projection 51 of the latching lever 48 to remain stationary, as is necessary to permit the lower edge 60 of the right leg 57 of the opening 50 in the latching lever 48 to arrest and maintain the movable support in the intermediate position. FIG. 3a illustrates the orientation of the components after the slide 21 has come to rest in the intermediate position. As before, the projection 34 of the bar 29 is in contact with the lowermost portion 36 of the opening 35 of the slide 21, with the projection 51 of the latching lever 48 being slightly below the uppermost portion 61 of the opening in the slide.

With the system at rest in the intermediate position, an operator input is required to effect a movement of the movable support 19 into either the operative position or the retracted position. The operator may move the movable support 19 into the operative position by moving the slide downward. This action will bring the uppermost portion 61 of the opening 35 in the slide 21 into contact with the projection 51 of the latching lever 48 and force it downward in conjunction with the slide 21. The latching lever 48 will rotate counterclockwise, moving the opening in the lever relative to the lug 30 of the movable support 19 to allow the lug to move downwardly into the lower portion 59 of the left leg 56 of the V opening 50 in the lever, which corresponds to movement of the movable support 19 into the operative position.

Referring to FIG. 2a, after the system has come to rest in the operative position, the slide 21 is held at the lowermost limit of its travel by the projection 34 of the bar 29. The projection 51 of the latching lever 48 occupies a position at the upper portion 61 of the opening 35 in the slide 21.

Having described the manner in which a cassette is inserted into the machine 10 and subsequently moved into the operative position, the manner in which the movable support 19 may be moved from the operative position into the intermediate position and ultimately to the retracted position will be outlined. Referring to FIG. 2a, an operator desiring to move the movable support 19 from the operative position into the intermediate position may effect that movement by sliding the slide 21 upward. The upward movement of the slide 21 is transmitted through the bar 34 to the lug 30 of the movable support 19. When the lug 30 of the movable support 19 reaches the intermediate position shown in FIG. 3, the spring 55 biasing the latching lever 48 will cause it to move counterclockwise, moving the opening 50 in the lever relative to the lug and interposing the lower edge 60 of the right leg 57 of the opening beneath the lug. At this point, the operator may release the pressure theretofore exerted upon the slide 21, with the latching lever 48 serving to restrain the movement of the movable support 19 in the same manner as when the movable support moved from the retracted position into the intermediate position upon the insertion of a cassette.

The final operation of moving the movable support 19 from the intermediate position to the retracted position may be effected by moving the slide 21 upward from its position shown in FIG. 3a to that shown in FIG. 1a. When this is done, the bar 21, acting upon the lug 30, causes the movable support 19 to move into the retracted position. This action triggers ejection means (not shown) causing the cassette to be ejected and allowing the spring blade 38 to flex into the position shown in FIG. 1b. Lug 41 restrains the movement of the movable support from the retracted position until the insertion of a cassette, as explained above. It will be appreciated that the opening 35 in the slide 21 permits the movement of the slide from the intermediate position into the retracted position without affect upon the latching lever 48, which remains stationary during this operation.

According to another aspect of the present invention, provision is made for the interrupting of the electrical current to the drive system (not shown) when the movable support 19 is in other than the operative position. This arrangement serves to assure that power is available to the drive system only when a cassette is in the machine and the pressure roller 16 and the head 18 are in operative relationships with respect to the tape, thereby avoiding the inadvertent or accidental application of power at other times.

To this end, an electrical switch 62 is provided. While the electrical connections to this switch 62 are not shown, it will be appreciated that the switch may be located at any place in the electrical circuit where an interruption in the circuit will accomplish the desired disabling of the drive system. A rod 63 interconnected between the lever and the center contact 64 of the switch 62 serves to open and close the center and lower contacts 64 and 65 of the switch in response to movement of the latching lever 48. As has been explained above, the latching lever 48 is in its clockwise position (FIG. 2) when the movable support 19 is in its operative position, with the lever being in its counterclockwise position (FIGS. 1 and 3) when the movable support is in the intermediate and fully retracted positions. Accordingly, as illustrated in FIGS. 1 and 3, with the latching lever 48 in its counterclockwise position, the contacts 64 and 65 of the switch 62 are open. As shown in FIG. 2, by contrast, with the movable support 19 in its operative position and with the latching lever 48 in its clockwise position, the center contact 64 of the switch is flexed downward into contact with the lower switch contact 65 thereby completing the circuit.

The above discussion has been devoted to the method and means by which the movable support 19 is semi-automatically and selectively moved into one of three stable positions. In the discussion which follows, there is described a further provision for temporarily moving the movable support 19 from its operative position into an intermediate position. The purpose of the temporary intermediate position, as contrasted with the stable intermediate position discussed above, is to permit the tape to be driven in the reverse direction for a short period of time. This rewinding allows the operator to prepare to listen to a passage which has been dictated or to re-record a portion of the tape.

Referring now to FIG. 2, a horizontally translating function selection slide 67 serves to select the operating mode of the machine. In the embodiment shown, the slide 67 has three stable positions—0 I and II—corresponding to stop, record and playback, respectively. In addition, the slide 67 has one unstable position—III—corresponding to rewind, wherein, in addition to electrical switching (not illustrated in the drawings or described herein), the movable support 19 is temporarily moved away from its operative position to move the pressure roller sufficiently to allow the tape to pass freely between the pressure roller 16 and the drive capstan 14.

Movement of the function selection slide 67 into the III position actuates a second slide 68. This second slide 68 is attached to the underside of the frame 11 for translational movement with respect thereto. Three slots, 69-71 in the frame 11, disposed horizontally, as viewed in FIG. 2, cooperate with three pins 72-74 to allow the translation of the slide 68. As the function selection slide 67 is moved into the rewind (III) position, the slide 68 translates to the right, whereupon an extension 75 of the slide 68 engages a lug 76 depending from the movable support 19 through an opening (not shown) in the frame 11. The upper surface 77 (as viewed in FIG. 2) of the extension 75 of the slide 68 serves as a cam to urge the lug 76 of the movable support 19 upward, thereby generating the required gap between the pressure roller and the capstan. Upon release of the function selection slide 67, a spring 78 causes the slide 68 to return to its rest position, which in turn causes the function selection slide 67 to return to the playback (II) mode.

Two observations may be made in comparing the temporary intermediate position with the stable intermediate position described earlier. First, the means to produce the two conditions are separate and operate entirely independent from one another. The former is produced with the function selection slide 67 as employed during the normal operation of the machine. The latter is produced through the combined effects of the latching lever 48, and slide 21 semi-automatically or manually in preparation for or after the normal operation of the machine. The second observation is that the magnitude of the movement of the movable support 19 effected by the action of the cam surface 77 upon the lug 76 is less than that required to move the movable support into the stable intermediate position described above. This relationship prevents the latching lever 48 from rotating counterclockwise into the position shown in FIG. 3 and thereby preventing the return of the movable support 19 to its operative position upon the release of the function selection slide 67.

I claim as my invention:

1. In an apparatus for the recording and playback of sound from a magnetic tape in a cassette, said apparatus having a fixed frame member, electro-mechanical reel and tape drive components mounted on said frame member including a tape drive capstan and reel spindles, said capstan being located to penetrate a cassette upon the insertion thereof into a playing position in said apparatus, a pressure roller for cooperating with said capstan for transporting said tape, a head for transducing signals onto and from the magnetic tape, and a movable support upon which said pressure roller and said head are mounted, said movable support being movably mounted on said frame for movement between an operative position, wherein with the cassette in said playing position, said pressure roller and said head are in their operative positions with the pressure roller pinching the tape against the capstan and the head engaged with the tape, and a retracted position, wherein said pressure roller and said head are in their retracted positions clear of the cassette and disengaged from the tape, the improvement comprising: means responsive to the movement of a cassette into said playing position for automatically moving said movable support from said retracted position toward said operating position, latch means carried by the frame member and interposed to arrest and maintain said movable support in a stable intermediate position wherein the pressure roller is spaced from the drive capstan sufficient to allow movement of the tape therebetween and said head is spaced from the operative position, and means for releasing said latch means and for selectively moving said movable support from said stable intermediate position into and from said operative position and from said intermediate position into said retracted position.

2. The improvement in an apparatus as set forth in claim 1 wherein said latch means comprises: an element carried by said frame member, said element being shiftable into a first position to engage said movable support in order to arrest and maintain said movable support in said stable intermediate position and into a second position to disengage said movable support in order to permit said movable support to move into said operative position; and biasing means to move said element into said first position when said movable support is between said intermediate and retracted positions.

3. The improvement in an apparatus as set forth in claim 2, said element of said latch means comprising: a lever, said lever being pivotably mounted to said frame, said lever having a first and second arm, said first arm having an opening into which a lug on said movable support projects, said opening having a surface to engage said lug and maintain said movable support in said intermediate position when said lever is pivoted into said first position.

4. The improvement in an apparatus as set forth in claim 3, said means for releasing said latch means and selectively moving said movable support comprising: a slide element, said slide element being carried by said frame, said slide element being slidable into a first, a second, and a third position, said slide element having an opening into which said second arm of said lever projects, said opening having a first surface to engage said second arm of said lever and pivot said lever from said first position into said second position when said slide element is slid from said second position into said third position.

5. The improvement in an apparatus as set forth in claim 4, said means for releasing said latch means and for selectively moving said movable support further comprising: a bar, said bar having a first and second portion, said first portion of said bar having a hole through which said lug of said movable support projects, said second portion of said bar projecting into said opening of said slide element, said opening of said slide element having a second surface to engage said second end of said bar such that when said slide element is slid from said third position to said second position, said first position of said bar acts on said lug to effect the movement of said movable support from said operative position into said intermediate position and when said slide element is slided from said second position to said first position, said first portion of said bar acts on said lug to effect the movement of said movable support from said operative position into said retracted position.

6. The improvement in an apparatus as set forth in claim 5 wherein means are employed to maintain the same positional relationship between said slide element and said second portion of said bar such that said slide element is in said first, second and third positions when said movable support is in said retracted, intermediate and operative positions, respectively.

7. The improvement in an apparatus as set forth in claim 4 further including an electrical switch carried by said frame member, said electrical switch having two contacts, means connecting one of said contacts to said lever such that when said lever is in said first position said contacts are open and when said lever is in said second position said contacts are closed.

8. The improvement in an apparatus as set forth in claim 1 wherein said responsive means comprises: means for resiliently biasing said movable support away from said retracted position and toward the operative position, and means for engaging and restraining said movable support in said retracted position against the effect of said biasing means, said restraining means being disengaged by a cassette as it moves into said playing position, whereupon said movable support is permitted to move toward said operative position under the force of said biasing means.

9. The improvement in an apparatus as set forth in claim 8 wherein said restraining means comprises: resilient means carried by the frame member, said resilient means being resiliently deflectable from a first position into a second position, said resilient means having a first and second projection thereon, said first projection being positioned such that when said movable support is in said first position, said first projection engages and restrains said movable support in said retracted position and when said resilient means is deflected into said second position, said first projection disengages and permits said movable support to move toward said operative position, said second projection being positioned such that when a cassette is inserted into said apparatus said resilient means will be deflected from said first position into said second position.

10. The improvement in an apparatus as set forth in claim 1 further including a control element carried by said frame and having a single degree of freedom, said control element serving to control the operation of the electro-mechanical reel and tape drive components.

11. The improvement in an apparatus as set forth in claim 10 further including means activated by said control element for moving said movable support from said operative position into a second intermediate position wherein the pressure roller is spaced from the drive capstan sufficient to allow movement of the tape therebetween.

12. The improvement in an apparatus as set forth in claim 11 wherein said means for moving said movable support from said operative position into a second intermediate position comprises: a slide carried by said frame member, said slide being sidable into a first and second position, said slide being biased toward said first position, said slide being movable into said second position by actuation of said control element, said slide having a cam surface, said cam surface interacting with a lug projecting from said movable support when said slide is moved against said bias into said second position, said interaction moving said movable support from said operative position into said second intermediate position, said bias causing said slide to move into said first position when said second control element is released.

13. The improvement in an apparatus as set forth in claim 11 wherein said second intermediate position is between said operative position and said stable intermediate position.

* * * * *